Figure 5A:
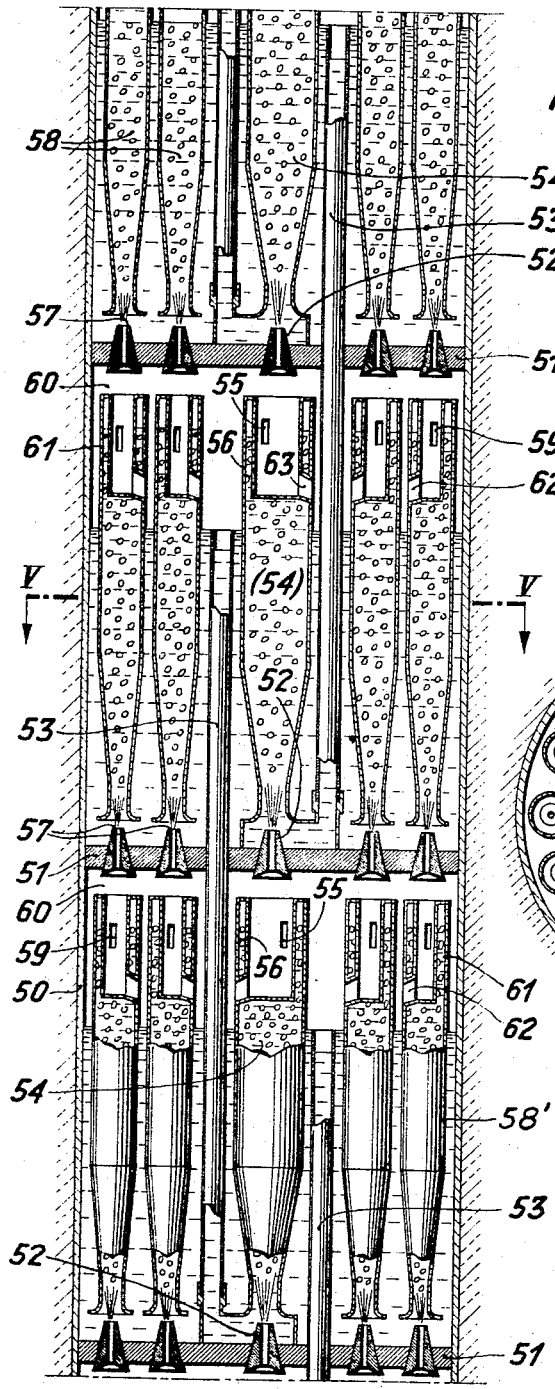

Jan. 23, 1968   F. HARTMANN   3,364,988
MATERIAL EXCHANGE COLUMN
Filed Dec. 18, 1964   5 Sheets-Sheet 1
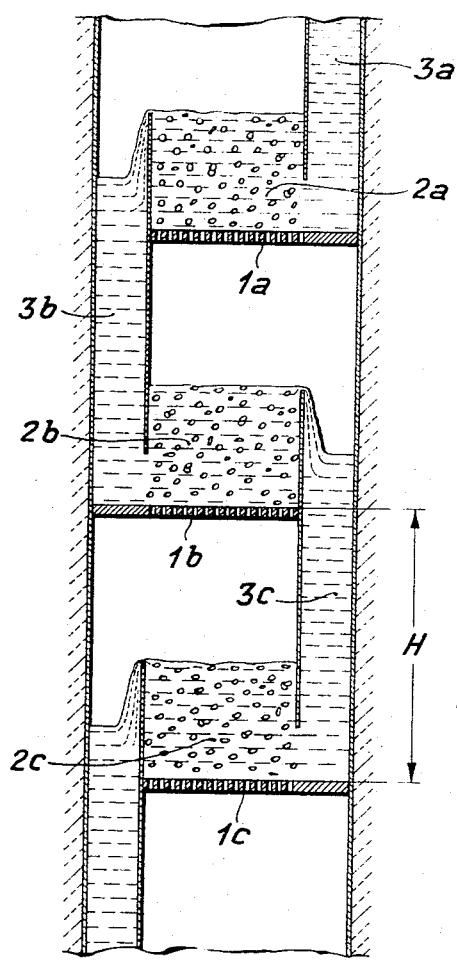
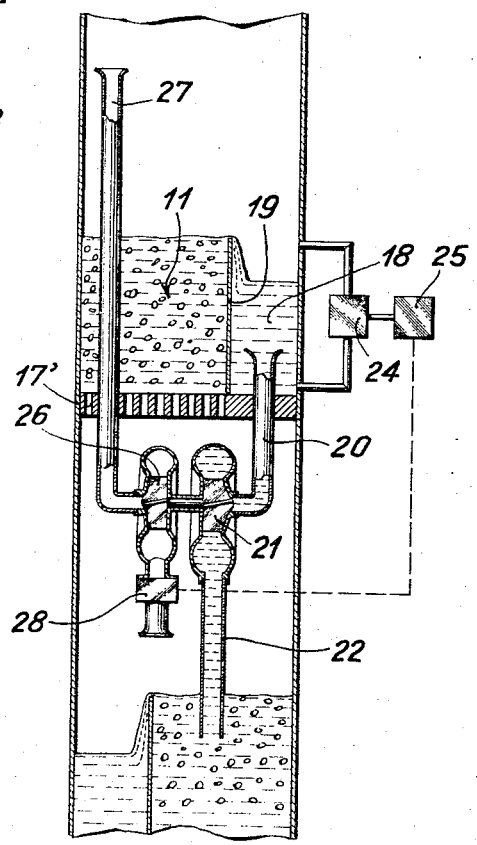
Inventor:
Fortunat Hartmann
BY
ATTORNEYS

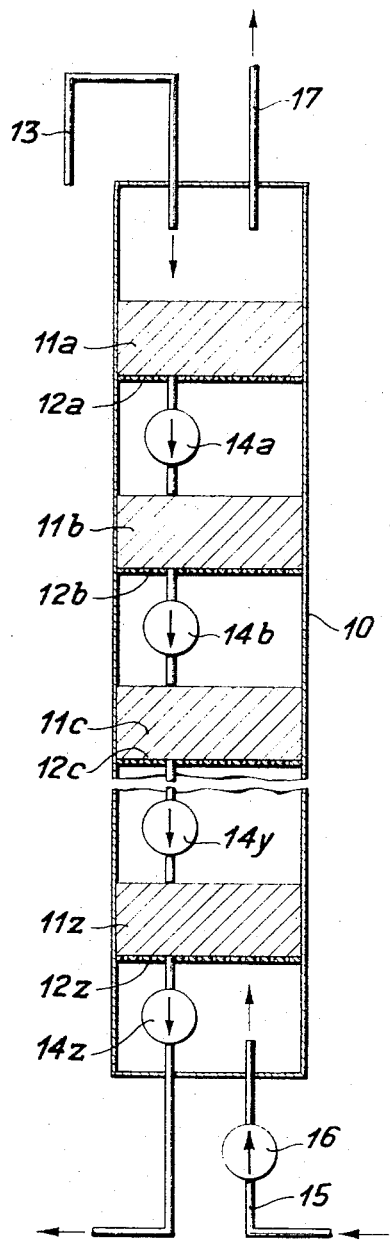
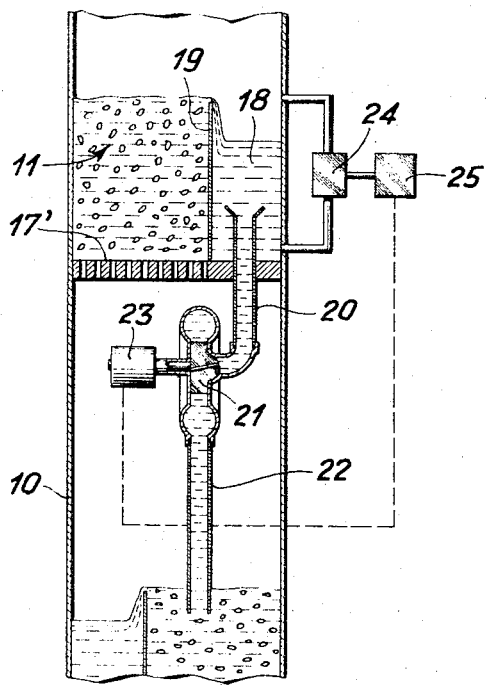

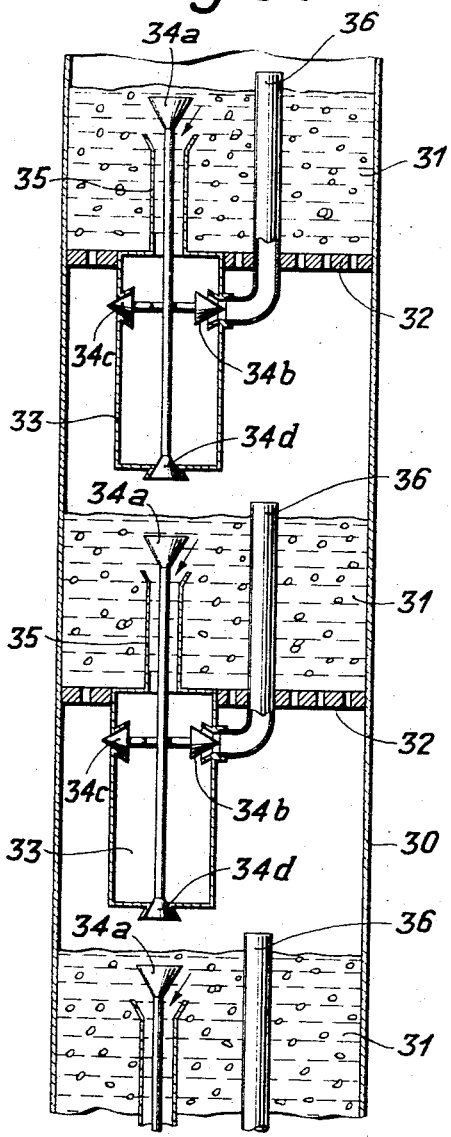
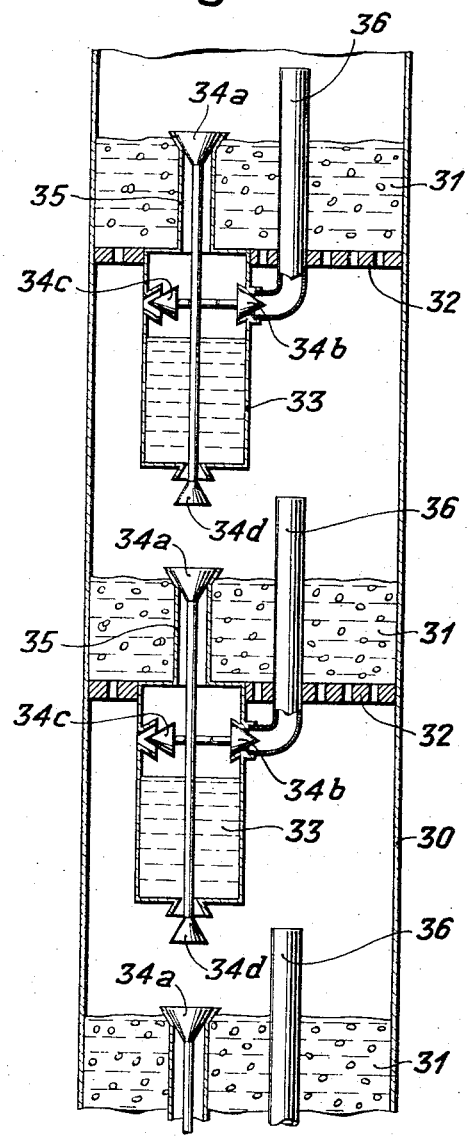

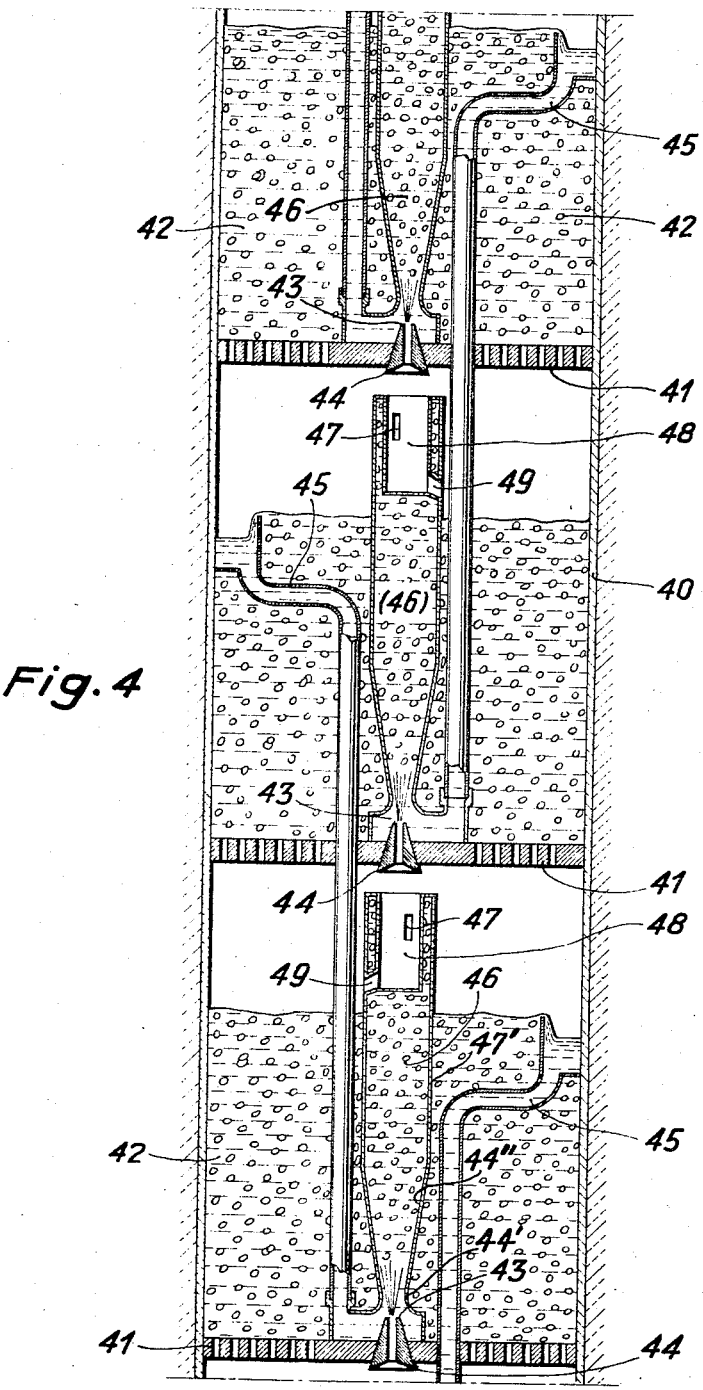

Jan. 23, 1968     F. HARTMANN     3,364,988
MATERIAL EXCHANGE COLUMN
Filed Dec. 18, 1964     5 Sheets-Sheet 5

Inventor:
Fortunat Hartmann
BY
ATTORNEYS

United States Patent Office 3,364,988
Patented Jan. 23, 1968

3,364,988
MATERIAL EXCHANGE COLUMN
Fortunat Hartmann, Zurich, Switzerland, assignor, by mesne assignments, to Les Houilleres du Bassin du Nord et du Pas-de-Calis, Douai, Nord, La Societe l'Air Liquide, Paris, La Compagnie de Construction Mecanique Procedes Sulzer, Paris, France, all French companies; and Le Commissariat à l'Energie Atomique, Paris, France, an agency of France
Filed Dec. 18, 1964, Ser. No. 419,354
Claims priority, application Switzerland, Dec. 19, 1963, 15,547/63
3 Claims. (Cl. 165—85)

The present invention pertains to a material exchange column or tower of the plate type for exchange between two fluid media flowing countercurrent in the column, in which trays are disposed one above another with suitable spacing between them.

Such columns are used, for example, for distillation, extraction, absorption and exchange processes such as increasing the concentration of one isotope in one of the fluid media. In such columns, it has heretofore been customary to rely on gravity to cause the heavier fluid to flow from top to bottom of the column, for example by means of overflow conduits and the like. With this mode of operation the pressure drop experienced by the lighter fluid flowing from bottom to top of the column cannot be made arbitrarily large without impeding the downward passage of the heavier medium through the column.

A section of such a column of the prior art is shown in FIG. 1. Three perforated trays $1a$, $1b$ and $1c$ are shown. These support layers $2a$, $2b$ and $2c$ of liquid respectively, which are traversed by upwardly streaming gas bubbles of the lighter fluid, the exchange effected being between a liquid and a gaseous phase. For transport of the liquid phase from tray to tray, spillover dams or conduits $3a$, $3b$ and $3c$ are provided. The spacing between adjacent trays is indicated at H. In order to achieve passage through the column of the heavier phase having a density $\gamma_s$, the pressure drop from tray to tray of the upwardly streaming lighter phase must not exceed the value $H\gamma_s$.

It is an object of the invention to improve substantially the efficiency of exchange columns of the above-indicated type by making possible the use of a higher tray-to-tray pressure drop of the lighter phase over the height of the column. With such an increased pressure drop a much better exchange effect may be achieved between the two phases which are brought in contact with each other.

Consideration of material exchange departs from the following: At the interface or contact surface between the two phases, the two phases are at all times in equilibrium. On both sides of this contact surface there exist boundary layers which separate the contact interface from the main body of each of the two phases. This assumes that the concentrations are constant in the main masses and that these concentrations vary only in the boundary layers.

The quantity G of material exchanged is given by the known equation:

$$G = KF\Delta C$$

in which K is the material transfer coefficient, F is the area of the interface between phases, and $\Delta C$ is the driving concentration gradient. K is approximately inversely proportional to the thickness $\delta$ of the boundary layers. The foregoing relations indicate that the quantity exchanged varies directly with phase interface surface per unit volume and inversely with the thickness of the boundary layers of the two contacting phases. In the case of exchange between a liquid and a gaseous phase, the phase interfaces are formed by the surfaces of the gas bubbles in the liquid layers on the trays. Minimum boundary layer thicknesses and maximum phase interface surfaces are achieved by providing high turbulence in the main masses of and in the boundary layers of the two phases. An increase in the turbulence can be achieved by stirring devices provided on the trays. The invention has, however, the object of achieving this result without special construction of the trays and without the provision of such stirring mechanisms.

According to the invention, circulating means are provided for transport of the downwardly streaming liquid from tray to tray. These means impose upon the downwardly flowing liquid medium a higher increase in pressure between trays than that which corresponds to the difference in hydrostatic pressure between the top and bottom of a liquid column having the same height as the separation of the trays. In this way the pressure drop in the upwardly streaming medium may be increased.

To provide pressure for upwardly driving the lighter phase there may be employed a pump such as a centrifugal pump, which may be disposed inside the column below the lowest exchange tray.

The necessary total pressure drop over the column can also be provided by a pressure storage vessel. Such an embodiment is especially advantageous when such a vessel is already provided for storage of one of the phases in compressed form, such vessel forming part of the exchange column installation. For example, when the lighter of the two phases to be subjected to exchange is a gas, this gas may be stored as a liquid in a pressure vessel and vaporized for generation of the desired pressure.

The heavier phase, which is in all cases a liquid, may be advanced from tray to tray by means of a separate pump in each case provided to surmount the pressure drop between adjacent trays, i.e., the pressure drop associated with the upwardly streaming lighter phase. In this way it is possible to tolerate a higher pressure drop per tray than would be the case if only the hydrostatic pressure of the liquid phase were relied upon. According to another feature of the invention, the heavier phase is transported from plate to plate by means of a jet pump of the so-called ejector type. According to still another embodiment of the invention, pressure equalization spaces are used as driving devices, these spaces being provided with alternately opened and closed valves.

The invention will now be further described in terms of a number of non-limitative examples with reference to the accompanying drawings in which:

FIG. 1 is a section through a material exchange column of the prior art;

FIG. $2a$ is a schematic representation of a column according to the invention in which pumps are provided for transport of the heavier phase;

FIG. $2b$ is a partial section of one form of column of the type schematically shown in FIG. $2a$;

FIG. $2c$ is a view similar to that of FIG. $2b$ but showing a modified form of drive for the pumps;

FIGS. $3a$ and $3b$ illustrate, with different positions for the valves thereof, an embodiment of the invention in which locks or pressure equalization chambers with successively closed and opened valves are employed as motive means to drive the heavier phase;

FIG. 4 illustrates an embodiment of a bubble plate column according to the invention having jet pumps for transport of the heavier phase; and FIGS. $5a$ and $5b$ are vertical and horizontal sections through a column according to the invention in which the heavier phase is advanced by means of jet pumps and in which the individual plates or trays themselves include jet pumps with reactor spaces and centrifugal separators for effecting exchange. The cross-sectional view of 5b is taken on the line V—V of FIG. 5a.

In a column as illustrated in FIG. 2a there may be carried out an absorption process, such as the separation of carbon dioxide out of a gaseous mixture of hydrogen and carbon dioxide, with the help of water as a washing medium. If a distillation process is to be carried out in such a column, there must also be provided a condenser for generation of the liquid to be recycled and an evaporator for generation of the gaseous phase to be put through the column.

The column of FIG. 2a is only fragmentarily shown. In FIG. 2a are illustrated the three uppermost exchange plates 11a, 11b and 11c and the lowermost plate 11z. Bubble trays 12a, 12b, 12c and 12z, each comprising a perforated metallic sheet or diaphragm, are affixed in gas-tight manner to the outer walls of the column so that the lighter phase streaming upwardly through the column is compelled to pass through the layers of liquid, one on each of these trays. The term exchange plate or plate is here used to denote in a general sense each of the liquid layers through which the gaseous phase is bubbled, and these layers are indicated in the figure by means of the diagonally shaded areas to which the reference characters 11a, 11b, 11c and 11z have been applied. The heavier phase, which may for example be water in the example suggested, is delivered into the column at the head thereof through a line 13. After passing in material exchange relation with the upwardly streaming gas at the uppermost plate 11a, this liquid is forced by pump 14a to the next lower plate 11b. Similarly, pumps 14b and 14y force the liquid to the plates 11c and 11z. According to the invention, these pumps impose on the rising gaseous phase a pressure drop from plate to plate greater than that of the change in hydrostatic pressure represented by a column of the liquid phase having a height equal to the separation of adjacent plates. From the lowest plate the liquid is carried off out of the column by means of a pump 14z. The lighter phase, taken in the example considered to be a mixture of hydrogen and carbon dioxide, is fed into the column through a line 15 with the help of a pump 16 and is withdrawn from the column at a line 17 for delivery to storage or consumption.

Although the pumps are shown in FIG. 2a as being disposed within the column they also may be outside thereof if, for example, it is desired that the column itself be of reduced dimensions.

FIG. 2b shows a section through one constructional form of a column of the type schematically shown in FIG. 2a. The plate generally indicated at 11 is limited at the lower end by a perforated tray 17', which is built in gas-tight fashion into the column and the perforations of which extend only over the actual exchange area thereof. Material exchange takes place at this plate between the liquid mass, brought down from a higher level by a pump not shown, and the gas mixture which is forced upward through the holes in the tray and through the liquid mass. As already indicated, the gas mixture flows through the liquid in the form of small bubbles and streams on upwardly into the next plate. The portion of plate 11 effective for exchange purposes is divided by means of a partition 19 from a spillover space 18. From this space a metered quantity of liquid is withdrawn by means of a suction line 20 leading to a centrifugal pump 21 from which the liquid is delivered through a line 22 to the next lower plate or level. The pump 21 is driven by an electric motor 23 whose rate of rotation is controlled in dependence upon the liquid level in the spillover space by means of a pressure difference measuring device 24 which operates on a motor controller 25. In this way continuous transport of the heavier phase is effected from plate to plate. In particular, with the construction shown the pumps are prevented from operating at too small a delivery rate, which would result in flooding of the upper end of the column. Likewise this arrangement prevents aspiration of gas by the pump or pumps if they tend to handle too large of a volume. By means of this level control it is therefore possible to employ pumps which are not designed all for exactly the same rate of delivery. With use of centrifugal pumps having free input thereto, which may be employed for any type of liquid, there is also insured a continuous flow of liquid through the column. Of course, piston type pumps may be used instead for transport of the heavier phase.

FIG. 2c shows a section through a material exchange column which is similar to that of FIG. 2b except that the pumps 21 which serve for transport of the liquid are not driven by motors requiring conductors to pass through the column but rather by turbines 26 which are advantageously disposed on the same shaft as the pumps. These turbines are driven by a fraction of the upwardly streaming lighter phase gaseous fluid. According to the amount of liquid to be delivered through the pump and in a manner analogous to that of FIG. 2b, the turbine is controlled by means of a throttling element 28 in the input line to the turbine, this element being controlled by a regulating device 25 which responds to signals from a pressure difference measuring device 24 operating on the spillover space 18 as in the embodiment of FIG. 2b. At the exit side of the turbine there is connected a line 27 which passes through the tray 17' above the turbine and also through the layer of liquid participating in exchange above that tray, line 27 terminating in the gas-filled inter-plate space above that layer.

The pressure differences between the suction and discharge lines of the pump and turbine are the same, neglecting the increase in static pressure due to the liquid column in the suction line of the pump. The mechanical efficiency $\eta$ of the turbine-pump combination is always less than unity and may for example be about 0.6. The quantity G in kilograms per second of the lighter fluid required to drive the turbine must hence amount at least to $L/\eta$, L being in kilograms per second the amount of the heavier fluid to be pumped. The means for driving the pump shown in FIG. 2c is employed only in columns in which the quantity of lighter fluid flowing per unit time is a multiple of the quantity of the heavier fluid flowing per unit time. This must be true since the gas passing through the turbine is by-passed around the exchange plate above it, which in itself lowers the efficiency of the installation. In many practical cases however, as in stripping and in gas washing columns, these relations between the two fluids are satisfied so that such a turbine drive for the pumps may be employed. In many cases it may be advantageous to return to the column effectively for exchange purposes that portion of the lighter phase passing through the turbine only at the second next higher plate or still higher in the direction of flow of the lighter fluid. The fluids passing through the column may so far as possible be employed as lubricants for the bearings of the pumps, and also for the bearings of the driving means therefor, such as motors or turbines.

FIGS. 3a and 3b are vertical sections through a column in which the heavier fluid is forced through the column with the help of pressure equalization chambers having alternately opened and closed valves so that the chambers operate much in the manner of locks.

As in the embodiments of FIGS. 2a and 2b, material exchange plates 31 are provided within a column jacket 30, these plates being positioned and defined by bubble trays 32 beneath them which are fastened in gas-tight fashion to the column walls. Each of these bubble trays is provided with a vessel 33 having four valves 34a, 34b, 34c and 34d. The valve 34a serves to control opening and closing of a passage defined by a tube 35 which extends up into the liquid layer above the associated bubble tray. The valve 34b similarly serves to control opening and closing of the passage defined by a tube 36 which extends between the vessel 33 and the gas space above its associated liquid exchange layer 31. The valves 34c and 34d control connection between the vessel 33 and the space immediately surrounding it, i.e., the gas space above the next lower exchange level. It is to be understood that in all embodiments, for the lighter phase the upper end of the column is the low pressure end thereof while the lower end of the column is the high pressure end thereof. Valves 34a and 34d open and close in opposite phases, and so do valves 34b and 34c.

FIG. 3a illustrates the condition of these valves while the vessel 33 is being filled. The valves 34a and 34b are open while 34c and 34d are closed. The lighter fluid present in the vessel 33, for example a gas mixture undergoing separation, passes out of the vessel through the conduit 36 into the gas space above the plate to which that vessel is appurtenant. In this way there occurs a pressure equalization between these two spaces, i.e., the interior of the vessel 33 and the gas space above the associated exchange plate. Concurrently, a quantity of the liquid from this plate flows by gravity down through the tube 35 and into the vessel 33. The valves 34a and 34b are now closed while 34c and 34d are opened, producing the condition of affairs illustrated in FIG. 3b. After achievement of pressure equilibrium between the interior of the vessel 33 and the gas space immediately surrounding it, the liquid flows by gravity out of the vessel 33 onto the next lower exchange plate. This filling and emptying process is repeated periodically. The valves may be driven mechanically, pneumatically, hydraulically or by electromagnetic means. In the embodiment illustrated, the valves are coupled together in pairs but it is of course possible to drive them individually. In determining the quantity of the gaseous phase to be passed through the column, it must be borne in mind that, upon the pressure equalization between the vessel 33 and the exchange level above it, there will occur a slight flow (the volume of the vessel 33) of the lighter phase upward without undergoing material exchange at the plate which that vessel belongs. That is to say, in the embodiment of FIGS. 3a and 3b, not all of the gas put through the column passes in material exchange relation with the descending liquid phase. Otherwise additional precautions must be taken, for example, to insure that the gas expelled from the vessel 33 will flow in intimate relation over the layer of liquid immediately above that vessel, in which way a material exchange effect can be achieved with that gas, although in general a less intensive one.

FIG. 4 shows a section through an exchange column in which the bubble trays 41 are mounted gas-tight within a pressure vessel 40. Reference character 42 identifies a layer of the liquid phase lying above each such tray (i.e., a "plate," as that term has been used herein), and through which a dispersion of the gas mixture flows to effect the actual material exchange. This layer may be called a blast layer.

Delivery of the liquid from the top to the bottom of the column is achieved by means of jet pumps 43 whose driving nozzles 44 are mounted in the individual bubble trays. Spillover tubes 45 are disposed, ending above each of these trays, through which the liquid from each level will be aspirated by the jet pump of the next lower plate so that the upwardly flowing gas or gas mixture serves as driving means to draw the liquid downward. It is to be noted thus that the spillover tube, while defining at its upper end the upper limit of the liquid layer at one plate, extends through the tray beneath that layer and down to the tray of the next lower plate, terminating in a venturi-type shroud or receiving nozzle 44′ about the ejector nozzle 44 of that next lower plate. The liquid so aspirated, mixed with gas streaming upward through the driving nozzle 44, passes through the receiving nozzle 44′, through an expanding portion 44″ or diffuser of nozzle 44′, a cylindrical space 46, and thence through inwardly directed tangential outlet nozzles 47 provided in a cylindrical member 48 at the upper end of the tube 47′ which forms the nozzle 44′, expanding portion 44″ and space 46. The mixture achieves high streaming velocities in emerging through the nozzles 47 so that there is achieved a sufficient vortex flow for a rapid separation of the two phases in the cylindrical space defined by member 48. The liquid fraction flows through an opening 49 into the associated separation plate where it undergoes material exchange with the gas flowing through the bubble tray beneath that plate. The gas separated out in the centrifugal separator 48 flows, together with the gas which has passed up through the liquid layer of the plate, through the bubble tray of the next higher plate, except for a small fraction which flows through the driving nozzle of the jet pump 44 of that next higher plate.

The vertical section of FIG. 5a, illustrates a column according to the invention in which, as in that of FIG. 4, the transport of liquid from the top to the bottom of the column stage to stage is effected by jet pumps. Again only three levels or plates have been shown in the column, which may be extended upwardly and downwardly as desired. Because of the particular conformation of structure defining the plates, a large pressure drop for the gas from plate to plate and hence a good material exchange can be achieved without bodily disruption of the liquid layers at the individual plates. Hence a large throughput can be achieved with the column.

Figure 5B:
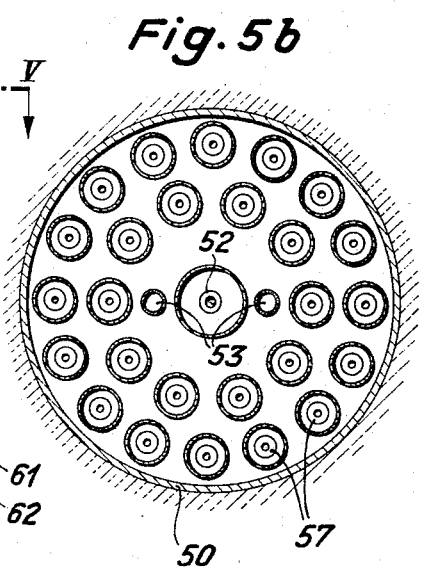

Within a column-defining cylindrical vessel 50 which is built to withstand pressure and which may be thermally insulated on the exterior, plural trays 51 are disposed one above the other, fitted gas-tight to the walls of the column. Each of these trays possesses at the center the driving nozzle 52 of a jet pump serving to drive the heavier phase downwardly through the column in the manner described in connection with FIG. 4. This arrangement, including the overflow aspirating line 53, reaction space 54, inward tangentially disposed outlet nozzles 55 and centrifugal separator tube 56 corresponds fully to the transport mechanism illustrated and described in conjunction with the example of FIG. 4. In the embodiment of FIGS. 5a and 5b, the trays 51 include additionally, for achievement of the material exchange function as such, the driving nozzles of twenty-six jet pumps or ejectors 57. These serve to effect a good vortex mixing of the heavier and lighter phases. The exchange mechanism of each plate thus comprises essentially the reaction spaces 58 disposed above the jet pumps 57. Each of these spaces is defined by a diffuser tube 58′ aligned with one of the ejector nozzles 57. At the upper end of each of those tubes there is provided a centrally disposed cylinder 61 having inwardly directed tangential exit nozzles 59. The cylinders 61 thus serve as centrifugal separators, connecting at their upper ends for the gas separated out therein with a common gas space 60 immediately beneath the tray 51 of the next higher plate. The gas separated out of the mixture in the centrifugal separators 61 flows together with that emerging from the centrifugal separator 56 through the nozzles of the jet pumps of the next higher bubble plate. The liquid separated out of the centrifugal separators 61 and separator 56 flows through the nozzles of the jet pumps of the next higher bubble plate. The liquid separated out of the centrifugal separators 61 and 56 flows through openings 62 and 63 downwardly onto the liquid layer, a portion passing through the overflow line 53 being aspirated by the jet pump 52 of the next lower level.

In the apparatus illustrated, there can be carried out for example an absorption process such as the washing of carbon dioxide with the help of water out of a methane-carbon dioxide mixture. With an hourly throughput of about 100 normal cubic meters of gas mixture and 1000 kilograms of water, and assuming five plates for the column with a pressure drop of 0.6 atmosphere per plate and a desired outlet pressure of 400 atmospheres for the gas, the gas mixture must be provided at a pressure of some 403 atmospheres absolute at the lower end of the column. At each level the ejector effect of the jet pump suffices, together with the static increase pressure corresponding to the hydrostatic pressure change between levels in the overflow line, to deliver a specified quantity of water downward notwithstanding the 0.6 atmosphere pressure increase from one plate to the next lower one. The ratio of the volume of the gas mixture serving to propel the water in the pumps 52 to the volume of water aspirated may for example be 5 to 1.

The columns according to the invention can in general be employed for the carrying out of exchange processes between gas or gas mixtures and liquids and also as between liquids of different densities. In the latter case, it is however necessary to provide special separators, as for example the centrifugal separators of FIGS. 4 and 5 in order to achieve a separation of the two phases.

It will thus be seen that the present invention provides exchange towers comprising means to define a generally vertically extending enclosed space, means to define a plurality of separate plates disposed one above the other within that space at which a downwardly flowing liquid fluid is mixed with an upwardly flowing fluid, and means supplementary to the force of gravity to propel the liquid downwardly from plate to plate. These supplementary means raise the pressure of the liquid phase as it moves from plate to plate downwardly through the tower. This increased change in pressure undergone by the liquid phase in passing through the tower permits, and requires, that the gaseous phase be supplied to the tower with a correspondingly increased difference between the high pressure at which the gaseous phase enters the tower at the bottom and the lower pressure at which it leaves the tower at the top. This increased pressure drop undergone by the upwardly flowing gaseous phase in traversing the tower effects a more intensive mixing of the two phases, and hence achieves an improved material exchange between the upwardly flowing gas phase and the downwardly flowing liquid phase.

The supplementary means may, in embodiments such as that of FIG. 2, be pumps relying on an outside energy source (e.g., an electric power system) to drive them. In other embodiments, such as those of FIGS. 2c, 3, 4 and 5, it is the gas phase itself which supplies the energy to drive the liquid pumps, whatever the form of those pumps. The invention thus, while described in terms of a number of preferred embodiments, is not restricted thereto but comprehends all variations thereon falling within the spirit and scope of the appended claims.

I claim:

1. An exchange tower comprising a casing, means to define within the casing at least two perforated trays disposed one above another on each of which a liquid flowing downwardly inside the casing builds up a layer of liquid to be traversed by an upwardly flowing fluid passing through the perforations in that tray and through that layer, a conduit extending from the layer of liquid on the upper tray into the layer of liquid on the lower tray, and pump means in said conduit for increasing the hydrostatic pressure difference between the liquid in the layer on said upper tray and the liquid in the layer on said lower tray, said tower further comprising means to supply a liquid to the interior of the casing above said trays and means to supply a fluid under pressure to the interior of the casing below said trays.

2. An exchange tower according to claim 1 wherein each of said trays includes a partition dividing the area of the tray into an exchange portion and a spill-over portion and in which said conduit extends from the spill-over portion of the upper tray to a point above the exchange portion of the lower tray and below the upper limit of the partition of the lower tray.

3. An exchange tower according to claim 1 comprising a turbine coupled to said pump means, and conduit means for supply of said fluid to said turbine from beneath one of said trays and for delivery of fluid from said turbine to a location above said one tray.

References Cited

UNITED STATES PATENTS

| | | | |
|---|---|---|---|
| 2,609,277 | 9/1952 | McNamara | 261—114 |
| 2,665,975 | 1/1954 | Ng | 23—270.5 |
| 2,694,979 | 11/1954 | Lauck | 103—874 |
| 2,709,641 | 5/1955 | Gerhold | 23—270.5 |
| 2,737,377 | 3/1956 | Huggins et al. | 261—114 |
| 2,749,094 | 6/1956 | Lewis et al. | 202—158 X |

ROBERT A. O'LEARY, *Primary Examiner.*

T. W. STREULE, *Assistant Examiner.*